(12) United States Patent
Chen et al.

(10) Patent No.: US 6,717,308 B2
(45) Date of Patent: Apr. 6, 2004

(54) ELECTRIC SPINDLE MOTOR AND METHOD HAVING MAGNETIC STARTING/STOPPING DEVICE

(75) Inventors: Shixin Chen, Singapore (SG); Qide Zhang, Singapore (SG)

(73) Assignee: Data Storage Institute, Singapore (SG)

( * ) Notice: Subject to any disclaimer, the term of this patent is extended or adjusted under 35 U.S.C. 154(b) by 51 days.

(21) Appl. No.: 09/750,551

(22) Filed: Dec. 28, 2000

(65) Prior Publication Data
US 2003/0201683 A1 Oct. 30, 2003

(30) Foreign Application Priority Data
Jun. 14, 2000 (SG) .................................. 200003328-2

(51) Int. Cl.⁷ ................................................. H02K 5/16
(52) U.S. Cl. .................... 310/90; 310/67 R; 360/99.08; 384/107
(58) Field of Search ..................... 310/90, 90.5, 67 R; 360/98.07, 99.08, 99.04; 384/100, 107

(56) References Cited

U.S. PATENT DOCUMENTS

| | | | |
|---|---|---|---|
| 4,630,943 A | * 12/1986 | Stahl et al. | 277/410 |
| 4,677,509 A | 6/1987 | Nishida et al. | 360/98.07 |
| 4,827,169 A | 5/1989 | Habermann | 310/90.5 |
| 5,223,758 A | * 6/1993 | Kataoka et al. | 310/67 R |
| 5,283,491 A | 2/1994 | Jabbar et al. | 310/90 |
| 5,358,339 A | 10/1994 | Konno et al. | 384/107 |
| 5,463,511 A | 10/1995 | Nakano et al. | 360/99.08 |
| 5,550,689 A | 8/1996 | Boutaghou et al. | 360/99.08 |
| 5,610,462 A | * 3/1997 | Takahashi | 310/90 |
| 5,697,708 A | 12/1997 | Leuthold et al. | 384/110 |
| 5,760,509 A | 6/1998 | Chung | 310/90 |
| 5,770,906 A | 6/1998 | Hazelton et al. | 310/90 |
| 5,806,987 A | 9/1998 | Nose et al. | 384/100 |
| 5,969,448 A | 10/1999 | Liu et al. | 310/90 |
| 6,175,174 B1 | * 1/2001 | Takahashi | 310/67 R |

FOREIGN PATENT DOCUMENTS

JP 7-110033 4/1995

* cited by examiner

Primary Examiner—Dang Le
(74) Attorney, Agent, or Firm—Oppenheimer, Wolff & Donnelly LLP

(57) ABSTRACT

A high precision spindle suitable for hard disk drives, optical disk drives, such as DVDs, CD drives, and other applications includes a hub, a hybrid hydrodynamic an aerodynamic bearing system, a brushless motor, a starting/stopping assistant device and a base. The hybrid fluid film bearing system ensures that the spindle works at high precision, low acoustic noise and low power consumption. The starting/stopping assistant device lifts the rotating portion of the spindle and its load by means of magnetic force, hence, reduces the friction between the contacted surfaces of thrust air bearing. It reduces the starting/stopping time and lessens the wear of bearing, therefore, effectively suppresses the contamination caused by wear particles. Magnetic seals are also provide to prevent journal bearing fluid from leaking.

6 Claims, 11 Drawing Sheets

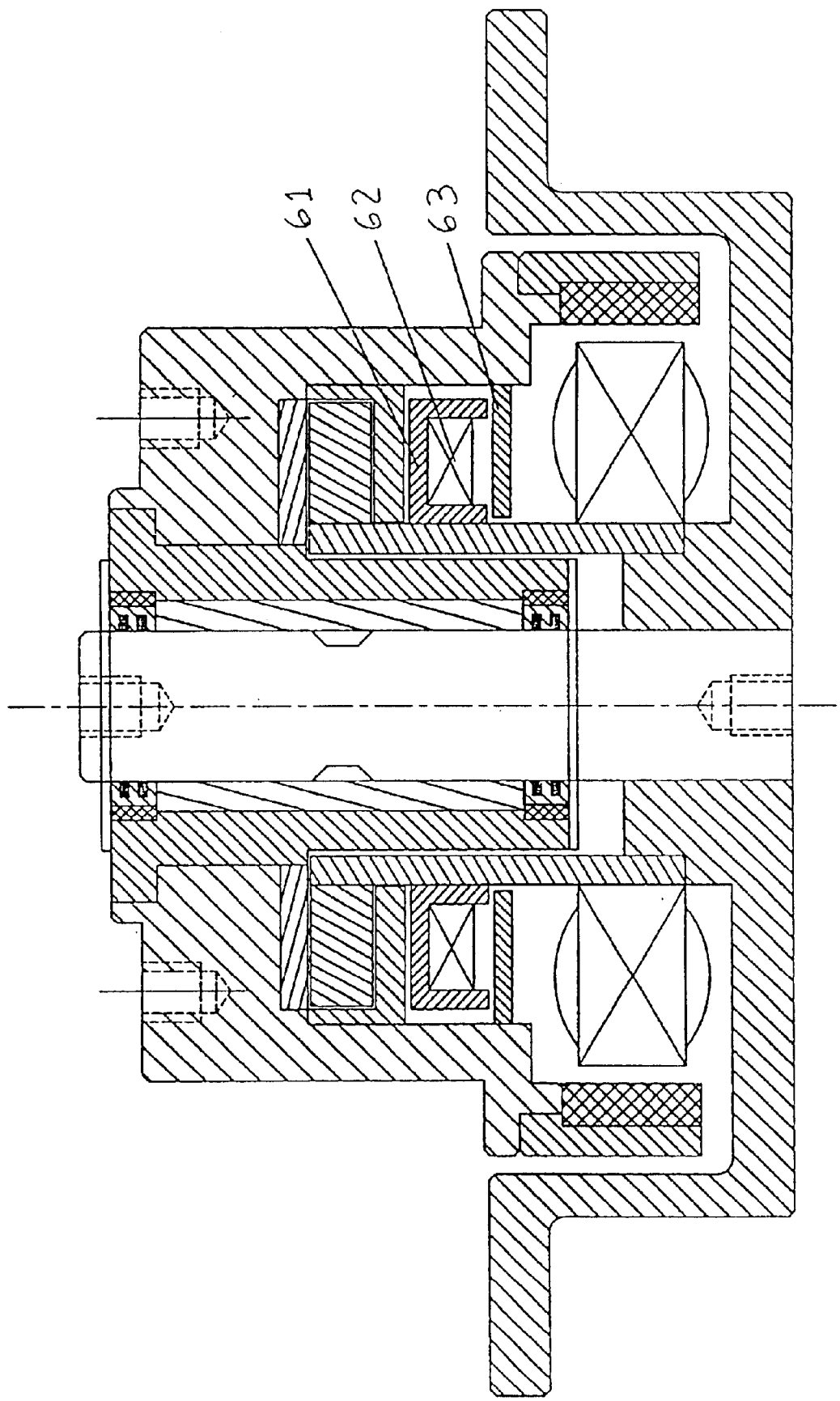
FIG. 4.1

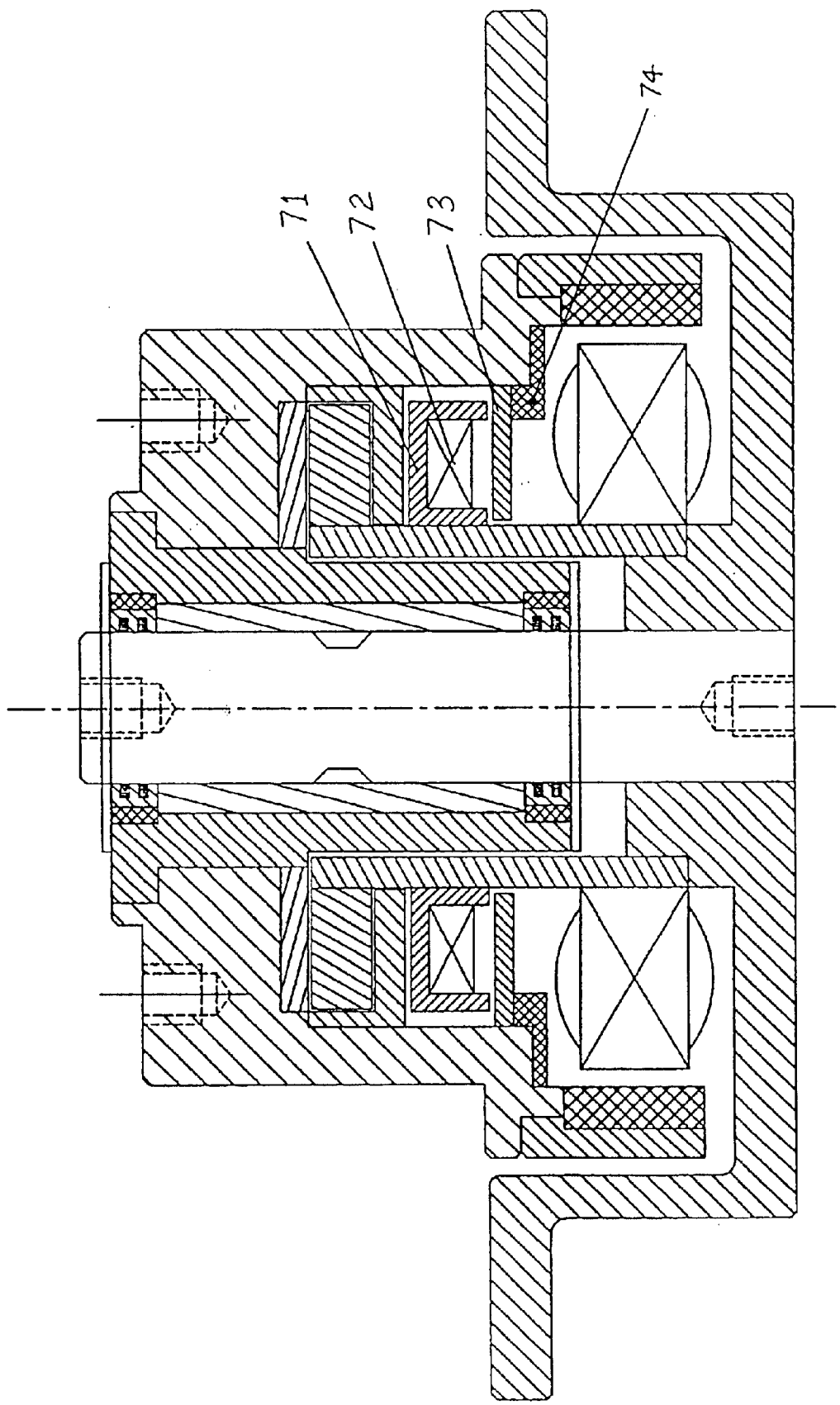
FIG. 4.2

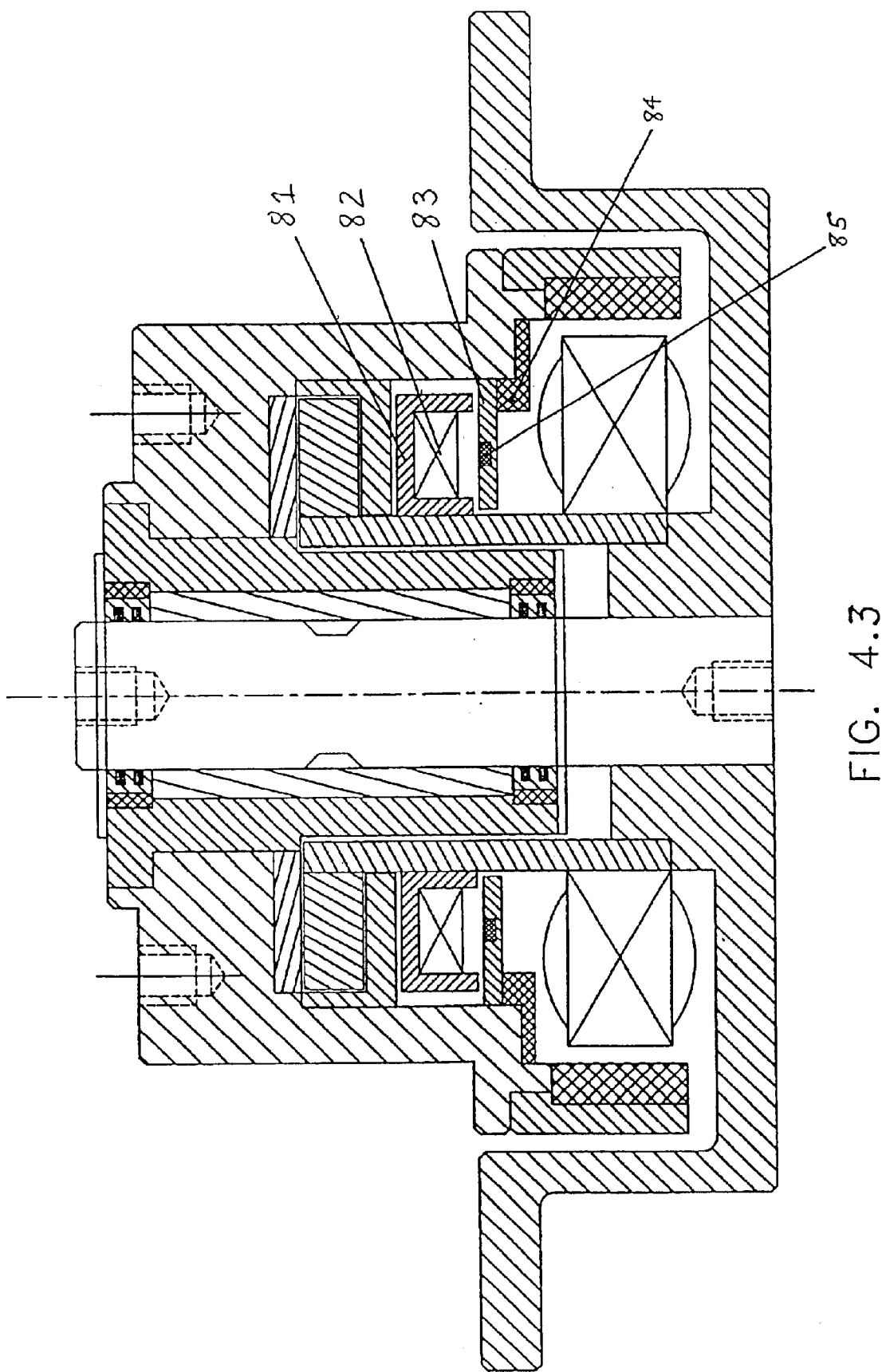
FIG. 4.3

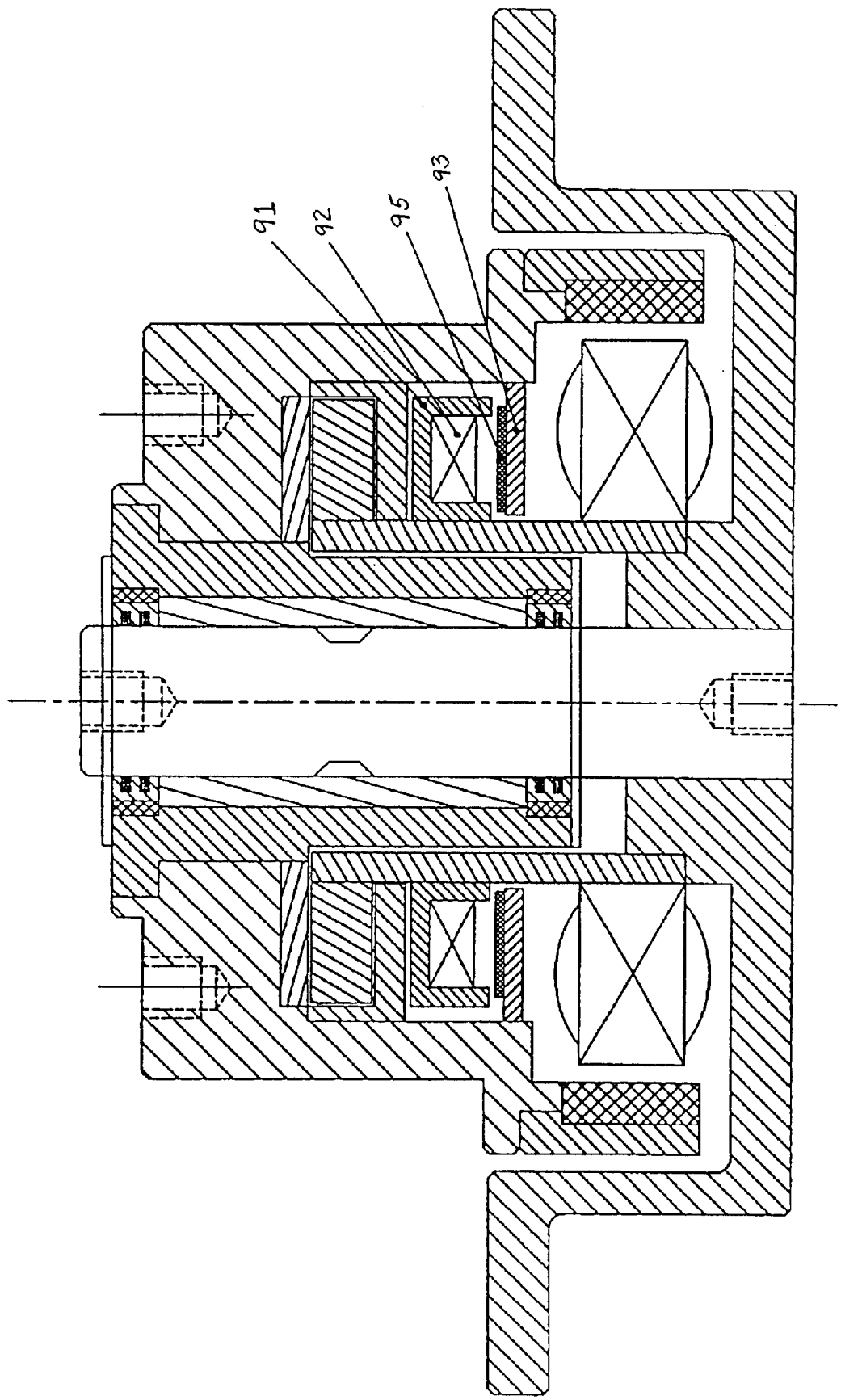
FIG. 4.4

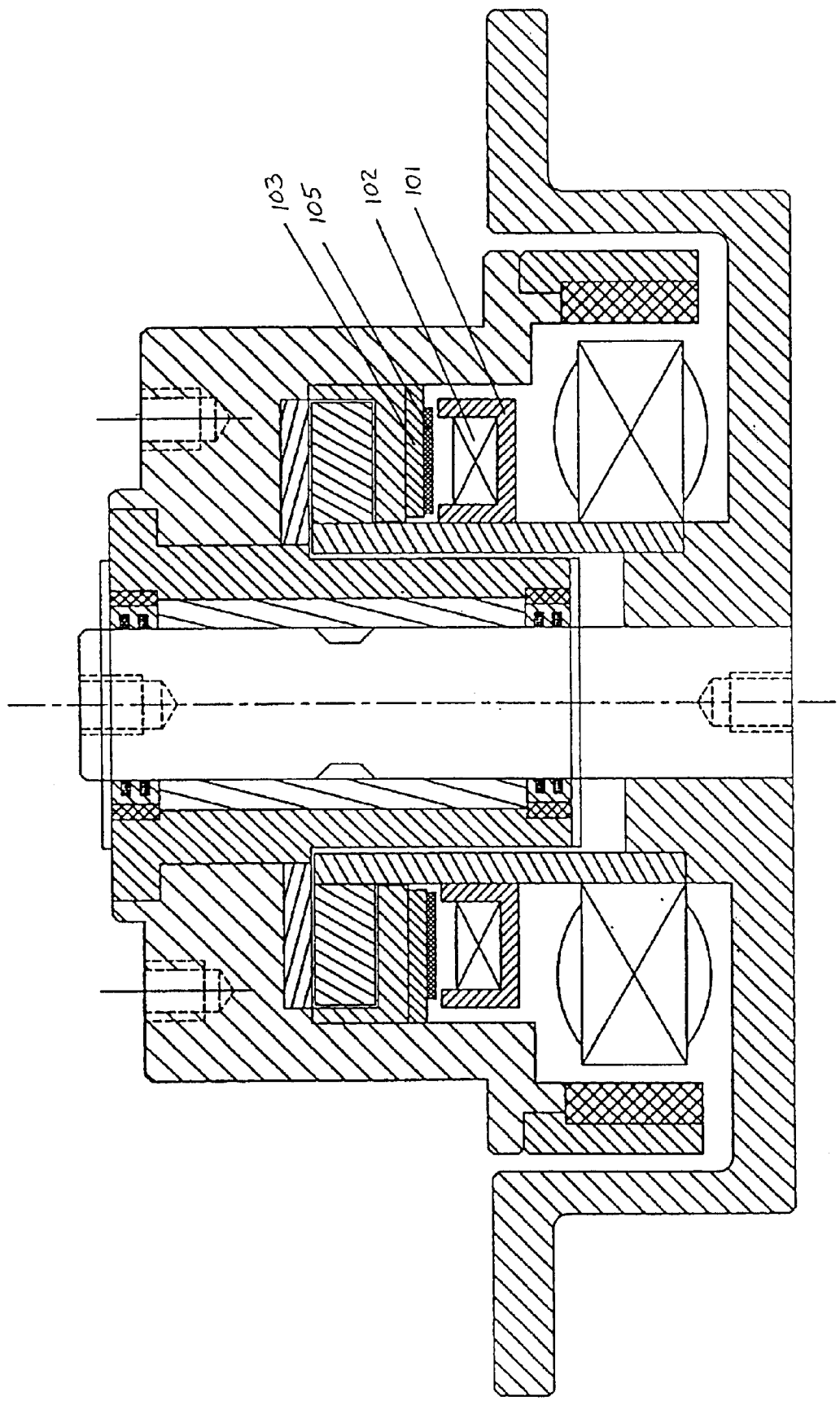
FIG. 4.5

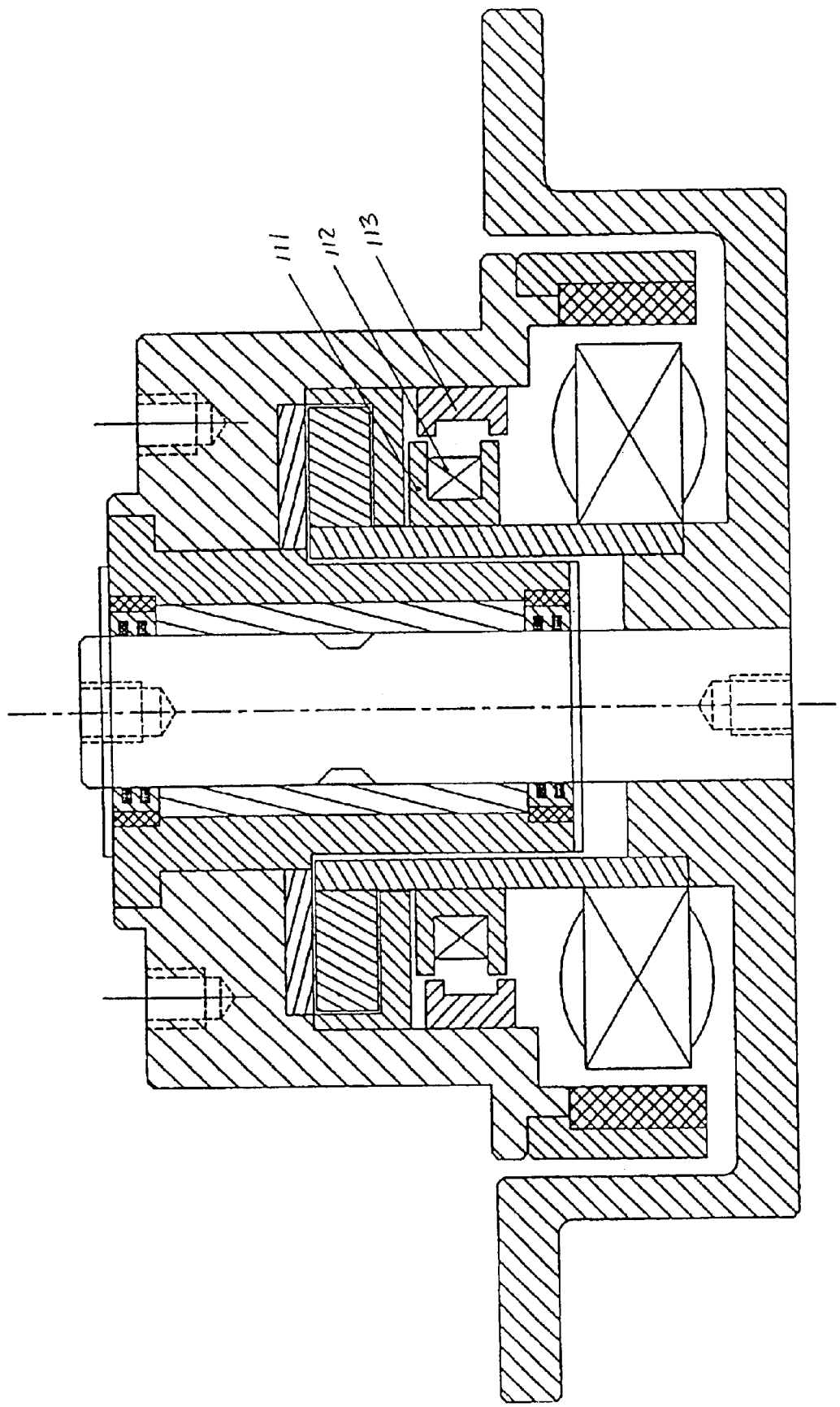
FIG. 4.6

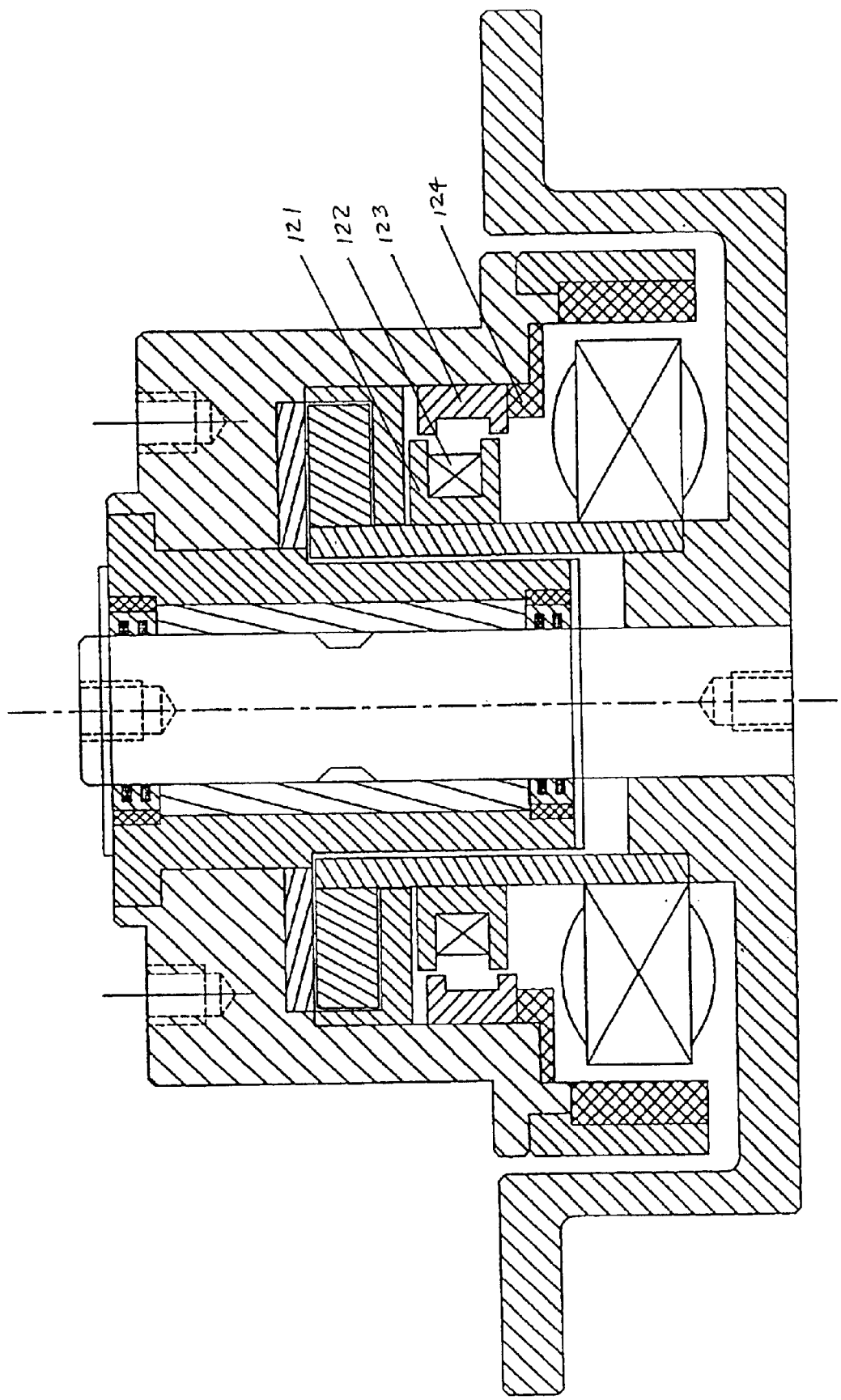
FIG. 4.7

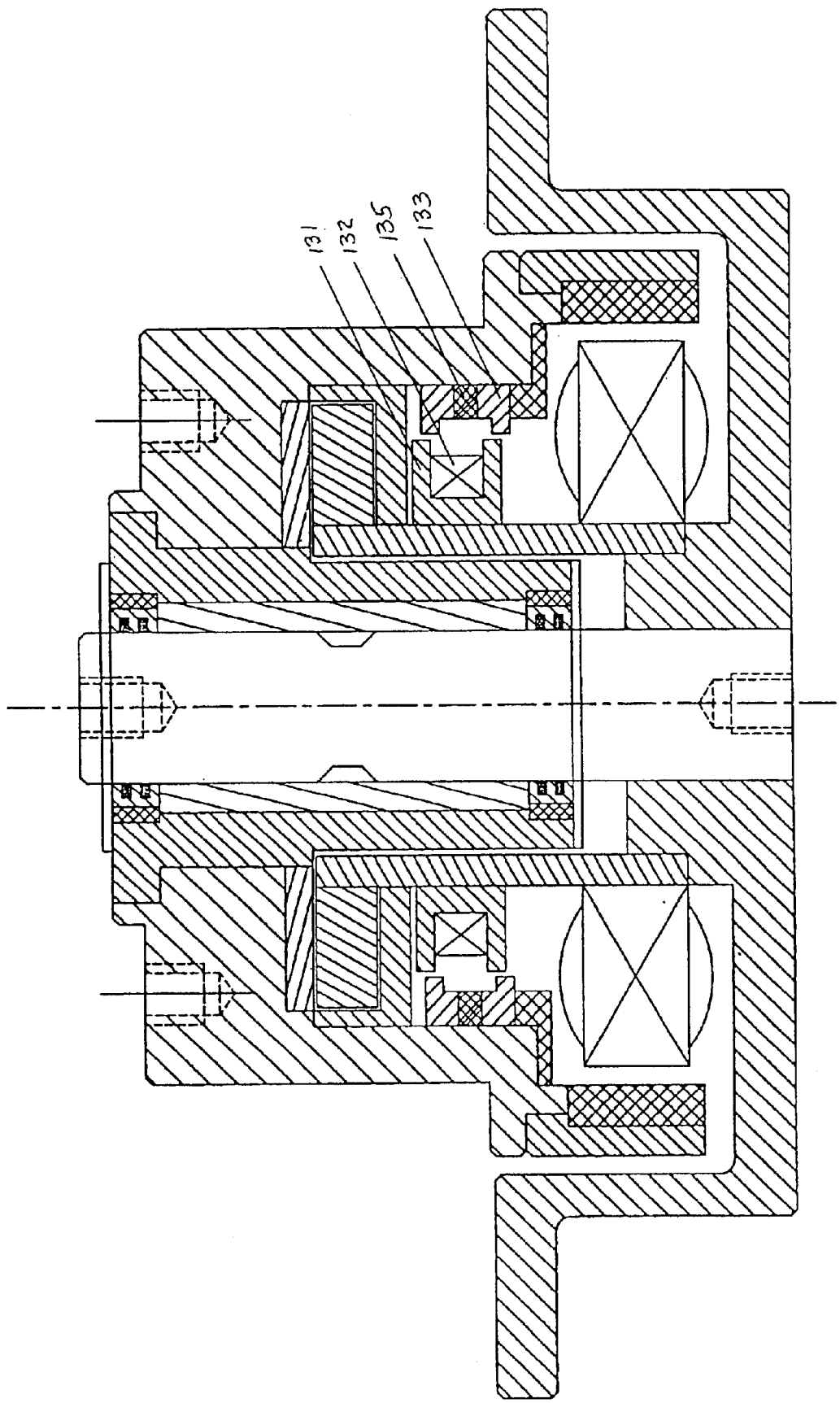
FIG. 4.8

ELECTRIC SPINDLE MOTOR AND METHOD HAVING MAGNETIC STARTING/STOPPING DEVICE

FIELD OF THE INVENTION

The present invention relates to a high precision spindle with hybrid fluid bearing system and starting/stopping assistant device. It has the advantages of high speed, high precision, low acoustic noise, low power consumption, shorten starting/stopping time and reduced risk of contamination. The spindle is suitable for applications such as hard disk drive, DVD drive, printer and other suitable cases.

BACKGROUND OF THE INVENTION

Description of Related Art

With the advance of computer technology, more and more is required of a hard disk drive, optical disk drive, and other motor-driven storage drives. It is expected that data storage capability of a hard disk drive will be much higher with shorter read/write time. Besides the larger storage capacity, the hard disk drive is also expected to have characteristics of lower acoustic noise and better reliability under external shock and vibration. The higher requirements result in each component in hard disk drive to do more and perform better.

There is no exception for a spindle motor. The key task of a spindle motor is to provide a disk drive with turning power that is rotatably stable and reliable for many years. The ideal spindle motor should possess the characteristics of lower repeatable runout (RRO) and non-repeatable runout (NRRO), lower acoustic noise, lower power consumption, fast starting and stopping, and higher resistance to external shock and vibration.

It is difficult for conventional ball bearing spindle motors to meet all of these requirements. Therefore, a conventional ball bearing spindle motor is not likely suitable to be used in next generation of hard disk drive due to its drawbacks of higher non-repeatable runout as well as higher acoustic noise. The drawbacks of ball bearing are caused by the imperfect geometry on the inner race, outer race and balls or rolling elements of ball bearings.

In contrast, fluid film bearings have no surface contact during operation. Hence, it may be a better alternative for ball bearings used in hard disk drives. The fluid film bearing shows significantly lower non-repeatable runout and acoustic noise, and its relative higher damping provides better resistance to external shock and vibration as described in U.S. Pat. No. 5,358,339 to Konno et al., U.S. Pat. No. 5,697,708 to Leuthold et al. and U.S. Pat. No. 5,770,906 to Hazelton et al.

One of the major difficulties with a fluid film bearing in a hard disk drive is leakage of liquid lubricant. The leakage of lubricant degrades the performance of the fluid bearing. Besides, the oil droplets that leaks from the bearing may contaminate the surfaces of disks and cause the failure of the hard disk drive.

In this aspect, the aerodynamic bearing is attractive because there is no risk of lubricant leakage. The spindle motors using aerodynamic bearings are described in U.S. Pat. No. 5,283,491 to Jabbar et al. and U.S. Pat. No. 5,760,509 to Chung et al. However, the air bearings have relatively lower load capacity and stiffness compared with oil bearings at similar geometric conditions. Furthermore, with a pure aerodynamic bearing system, the hub and the base of spindles are electrically insulated during the operation of spindles. The electrical insulation blocks the discharging of static charges from the base of spindles, which would otherwise result in possible damage of magnetoresistence (MR) head and cause failure of hard disk drives.

The air bearings also have relatively higher wear ratio, especially during the starting and stopping times of the spindle motor. Besides, the prior inventions cannot prevent the contamination caused by the tiny particles out of the bearings, which are generated by the wearing of bearing surfaces, especially at the moment of starting and stopping of spindles.

The present invention attempts to overcome the above-mentioned drawbacks in prior inventions and provides a hybrid fluid-bearing system spindle with the advantages of power saving, fast starting, contamination free and cost-effective.

SUMMARY OF THE INVENTION

A general objective of the present invention is to provide a power saving, fast starting, contamination free, cost-effective, spindle motor with hybrid fluid bearing system for hard disk drive and other storage devices. The present invention will overcome the limitations and drawbacks of the prior art.

Another objective of the present invention is to provide a spindle motor with magnetic assisting starting/stopping device, which reduces the friction and wearing during the moment of starting/stopping, therefore, results in a fast starting spindle motor with reduced risk of contamination caused by worn particles.

A further objective of the present invention is to provide a hybrid bearing design for disk drive spindles, which comprises hydrodynamic journal bearings and aerodynamic thrust bearings. With the hybrid design of the bearing system, the total power consumption is reduced. By means of ferrofluid seals, the bearing system obtains substantially a contamination free condition.

The basic construction of the hybrid bearing system comprises two hydrodynamic journal bearings and two aerodynamic thrust bearings. The journal bearings are sealed by means of magnetic fluid seals.

An additional objective of the present invention is to provide an electrical path for discharging the static charges in order to protect electric charge sensitive devices, especially for Magnetoresistance (MR) head disk drives.

In one embodiment of the present invention, the aforementioned hybrid bearing unit is assembled to a disk drive spindle. The spindle comprises a rotational hub assembly and a stationary base assembly. The hub assembly consists of a hub onto which the magnetic recording disks can be mounted, a shaft sleeve housing that is securely fixed to the hub, two magnetic ring and two sealing rings that are fixed to the upper and bottom ends of the shaft sleeve housing, a shaft sleeve, two thrust bearing covers, rotor of an electric motor, e.g. magnetic poles and their back iron. The base assembly consists of a base, an electric motor stator, a shaft that is fixed to the base, a thrust plate that is also fixed to the base, a magnetic starting/stopping device that is located beneath the lower cover of thrust bearing, respectively.

The invention will be described in details with reference to the drawings.

DESCRIPTION OF THE DRAWINGS

The features of present invention will be more apparent by reference to the following detailed descriptions together with the following drawings:

FIGS. 4.1 through 4.8 illustrate enlarged cross-sectional views of exemplary hard disk drive spindles with variations in the starting/stopping assistant device in accordance with the principles of the present invention.

DETAILED DESCRIPTION OF THE INVENTION

Figure 1:
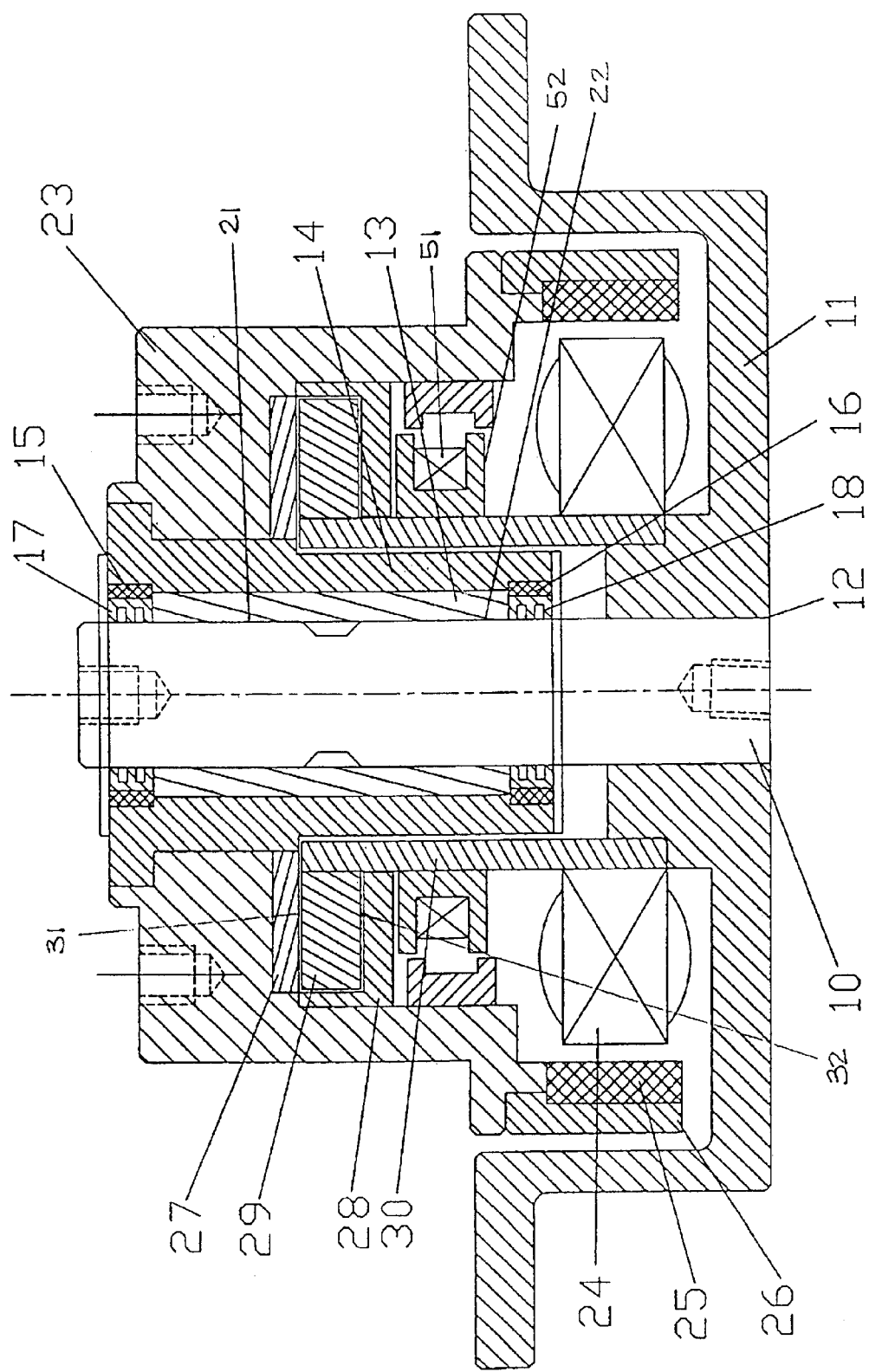
FIG. 1 illustrates an enlarged cross-sectional view of an exemplary hard disk drive spindle in accordance with the principles of the present invention.
Figure 2:
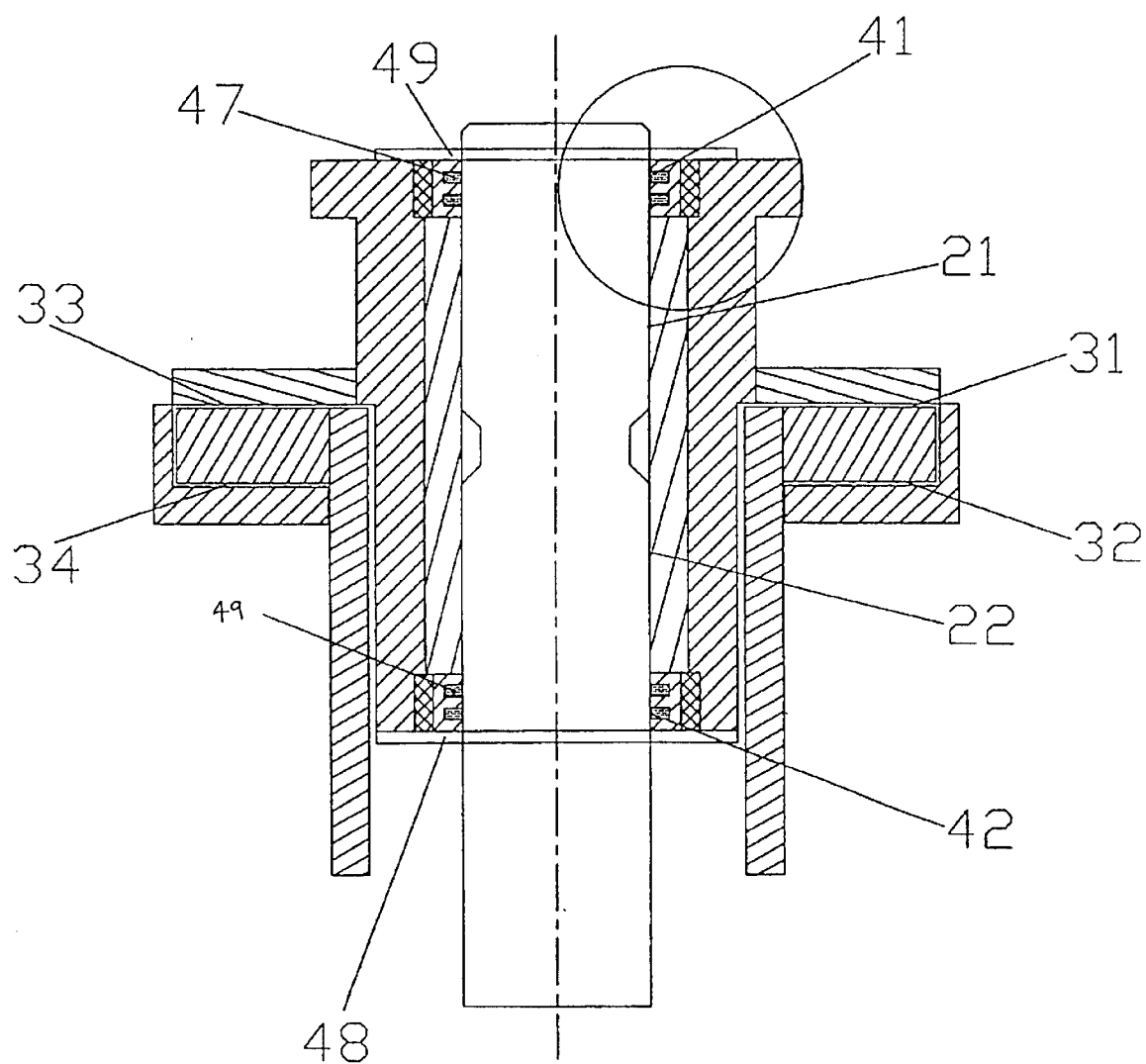
FIG. 2 illustrates an enlarged cross-sectional view an exemplary hybrid fluid bearing system that is used in the spindles as described in FIG. 1.

FIG. 1 illustrates an exemplary spindle assembly for a high performance hard disk drive. The spindle assembly comprises a stationary sub-assembly and a rotating sub-assembly. The stationary sub-assembly includes a base 11, a shaft 10, a thrust plate 29, a stator 24 and two components 51 and 52 of a starting/stopping assistant device. The rotating sub-assembly comprises a hub 23, a magnet ring 25 and its yoke 26, a shaft sleeve 13 and its housing 14, two magnetic sealing rings 15 and 16 having respective two sealing pole rings 17 and 18, and two thrust plate covers 27 and 28.

The shaft 10 is fixed to the base 11 by being press-fit and/or bonded into a suitable sized opening 12 defined in the base 11. A shaft sleeve 13 is co-cylindrically situated and rotatable around the shaft 10, and is securely attached to a housing 14. The shaft 10 and the shaft sleeve 13 form a fixed shaft journal bearing configuration, which has better vibration resistance than that of a rotating shaft configuration. Therefore, the fixed shaft configuration is preferred in hard disk drive application.

Two magnetic rings 15 and 16 together with corresponding sealing poles 17 and 18 are fixed to the upper and bottom ends of the sleeve housing 14, respectively. The cylindrical inner surface of the sleeve 13 together with the cylindrical outer surface of the shaft 10 cooperatively define two hydrodynamic journal bearings 21 and 22. The oil lubricant is filled into the gaps of journal bearings 21 and 22. Compared to aerodynamic journal bearings, the oil journal bearings provide higher radial load capacity and stiffness as well as higher radial damping.

A spindle hub 23 is attached to the sleeve housing 14 and supports one or more data storage disks. An electrical motor is provided to rotate the hub 23 and disks relative to the base 11 and the shaft 10 at a predetermined angular velocity. The motor includes a stator assembly 24, a rotating magnet 25, and a ferromagnetic flux return yoke 26. The magnet 25 is fixed to the inner wall of the yoke 26, while the yoke 26 is fixed to the hub 23 as shown in FIG. 1.

An upper annular thrust bearing cover 27 and a lower annular thrust bearing cover 28 fit securely to the hub 23. A thrust plate 29 is fixed to the upper end of a thrust plate supporter 30, and a lower end of the thrust plate supporter 30 is tightly fixed to the base 11. Together, the upper plane surface 31 and the lower plane surface 32 of the thrust plate 29 with corresponding thrust bearing covers 27 and 28 provide two aerodynamic thrust bearings 33 and 34.

The radial bearings 21 and 22 comprise the shaft 10 and the sleeve 13, and the axial bearings 33 and 34 comprise the thrust plate 29 and the thrust bearings 27 and 28. It is preferred that the materials of these parts have complementary coefficients of thermal expansion since the motor as well as the frictional loss of bearings will generate heat during operation and cause the expansion of the shaft 10, sleeve 13, thrust plate 29 and thrust bearings 27 and 28. It is preferred that the shaft 10 and the thrust plate 29 are made of stainless steel or carbon steel, and in these cases a bronze alloy is chosen for the sleeve 13. Alternatively, the shaft 10 and the sleeve 13 may be both formed of stainless steel. Or, the shaft 10 could be made of stainless steel AISI 440C that can be hardened and the sleeve 13 could be made of AISI 303 that is relatively softer than AISI 440C.

The bearing surfaces are preferably finished to an ANSI surface finish of approximately 0.2 $\mu$m root-mean-square, or better. To increase the load capacity and stiffness of the bearing system, the outer cylindrical surface of the shaft 10 and/or the inner cylindrical surface of the shaft sleeve 13 is engraved with herringbone grooves. The upper plane surface 31 and the bottom plane surface 32 of the thrust plate 29 or their matting surface of thrust bearing covers 27 and 28 may also be grooved with herringbone or spiral grooves.

Two magnetic seals 41 and 42 are applied at the upper end and bottom end of the journal bearings. The upper seal comprises magnet ring 15, sealing ring 17, the cylindrical surface of the shaft 10 and the ferrofluid 47 in the gap between the sealing ring 17 and the cylindrical surface of the shaft 10. The lower seal comprises a magnet ring 16, sealing ring 18, the cylindrical surface of the shaft 10 and the ferrofluid 47 in the gap between the sealing ring 18 and the cylindrical surface of the shaft 10. The magnetic force captures the ferrofluid tightly within the gaps formed by the shaft 10 and magnetic seal rings 17 and 18.

Figure 3:
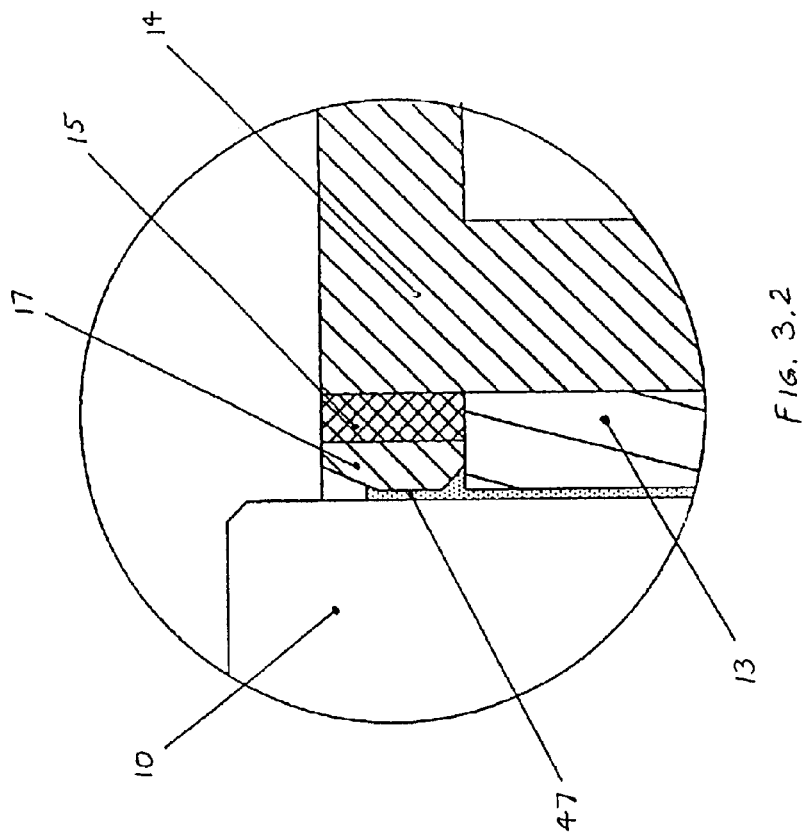
FIGS. 3.1 and 3.2 illustrate enlarged cross-sectional views of exemplary magnetic seals in accordance with the principles of the invention.
Figure 3:
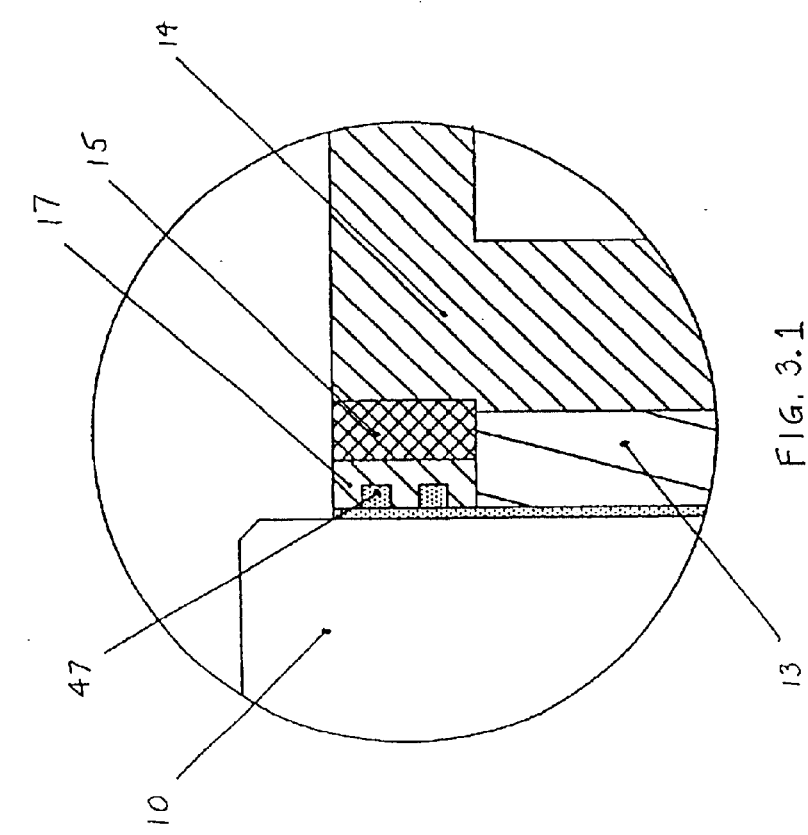

FIGS. 3.1 and 3.2 illustrate two different exemplary designs of magnetic seals. Except the design considerations for magnetic path, the recessions in FIG. 3.1 and wedge in FIG. 3.2 also function as the reservoir of the oil when it is pushed out due to the temperature rising of the bearing system. Therefore, the magnetic seals effectively prevent the lubricant leaking from journal bearings. Two oil absorbers 48 and 49 are attached to the bottom end and upper end of the sleeve housing 14 to absorb oil and prevent it from contaminating the disks surfaces due to the evaporation at the condition of extreme low environment pressure.

The magnetic starting/stopping device comprises a stator lamination 52, a coil 51 and a magnetic platter 53. By a control circuit, at the starting moment, current is supplied to coil 52, which together with magnetic platter 53 generates an axial force to separate the whole rotary sub-assembly of the spindle from the base sub-assembly rapidly before the spindle rotates. While in stopping process, the magnetic force generated by the starting/stopping assistant device holds the rotating portion of the spindle motor quickly and helps the spindle motor to reach steady state in shorter time. Therefore, the device effectively reduces the friction and wear of thrust bearings, resulting in fast starting/stopping, and results in a worn particle free condition. Together with the oil sealing devices 41 and 42, the contamination free condition is safely guaranteed.

FIGS. 4.1–4.8 show various alternative configurations of the starting/stopping assistant device. The electric spindle motors described are the same as the spindle shown in FIG. 1, except for variations in the starting/stopping device.

FIG. 4.1 illustrates an exemplary electric spindle motor having an exemplary starting/stopping device comprising a stator lamination 61 with a coil 62 and a magnetic platter 63. The stator lamination 61 and coil 62 are securely fixed to the thrust supporter 30. The magnetic platter 63 is securely fixed to the inner wall of the hub 23. In this exemplary configuration, the stator lamination 61 and coil 62 are oriented in a manner that the opening of the lamination 61 faces downward towards the horizontally-oriented magnetic platter. In operation, when current is supplied to the coil 62, a magnetic field is created which attracts the magnetic platter 63 towards the lamination 61/coil 62. Because the magnetic platter 63 is securely fixed to the hub 23, this action moves the rotating assembly away from the base assembly to allow freer rotation of the rotating assembly.

FIG. 4.2 illustrates another exemplary electric spindle motor having an exemplary starting/stopping device comprising a stator lamination 71 with a coil 72 and a magnetic platter 73. The configuration of the starting/stopping device is the same as the one illustrated in FIG. 4.1, except with the addition of a magnetic washer 74 which is securely coupled to the hub 23 and the magnetic platter 73, and together with magnet 25 creates a magnet preloading.

FIG. 4.3 illustrates another exemplary electric spindle motor having an exemplary starting/stopping device comprising a stator lamination 81 with a coil 82 a magnetic platter 83, and a magnetic washer 84. The configuration of the starting/stopping device is the same as the one illustrated in FIG. 4.2, except that the magnetic platter 83 has embedded (or disposed thereon) a permanent magnet ring 85 which creates a magnetic preloading to prevent free movement of rotating assembly during shipping, and generates additional thrust and journal bearing force to stabilize the bearing system.

FIG. 4.4 illustrates another exemplary electric spindle motor having an exemplary starting/stopping device comprising a stator lamination 91 with a coil 92 and a magnetic platter 93. The configuration of the starting/stopping device is the same as the one illustrated in FIG. 4.1, except that the magnetic platter 93 has embedded (or disposed thereon) a permanent magnet ring 95 which creates a magnetic preloading to prevent free movement of rotating assembly during shipping, and generates additional thrust and journal bearing force to stabilize the bearing system.

FIG. 4.5 illustrates another exemplary electric spindle motor having an exemplary starting/stopping device comprising a stator lamination 101 with a coil 102 and a magnetic platter 103. The stator lamination 101 and coil 102 are securely fixed to the thrust supporter 30. The magnetic platter 103 including a permanent magnet ring 105 is securely fixed to the inner wall of the hub 23 and/or the lower annular thrust bearing 28. In this exemplary configuration, the stator lamination 101 and coil 102 are oriented in a manner that the opening of the lamination 101 faces upward towards the horizontally-oriented magnetic platter 103.

FIG. 4.6 illustrates an exemplary electric spindle motor having an exemplary starting/stopping device comprising a stator lamination 111 with a coil 112 and a magnetic platter 113. The stator lamination 111 and coil 112 are securely fixed to the thrust supporter 30. The magnetic platter 113 is securely fixed to the inner wall of the hub 23. In this exemplary configuration, the stator lamination 61 and coil 62 are oriented in a manner that the opening of the lamination 111 faces radially outward and is vertically offset above the magnetic platter 113. In operation, when current is supplied to the coil 112, a magnetic field is created which attracts the magnetic platter 113 towards the lamination 111/coil 112. This magnetic attraction causes the magnetic platter 113 to move vertically upward so that it is more aligned with the lamination 111/coil 112. Because the magnetic platter 113 is securely fixed to the hub 23, this action moves the rotating assembly away from the base assembly to allow freer rotation of the rotating assembly.

FIG. 4.7 illustrates another exemplary electric spindle motor having an exemplary starting/stopping device comprising a stator lamination 121 with a coil 122 and a magnetic platter 123. The configuration of the stating/stopping device is the same as the one illustrated in FIG. 4.6, except with the addition of a magnetic washer 124 which is securely coupled to the hub 23 and the magnetic platter 123.

FIG. 4.8 illustrates another exemplary electric spindle motor having an exemplary starting/stopping device comprising a stator lamination 131 with a coil 132 a magnetic platter 133, and a magnetic washer 134. The configuration of the stating/stopping device is the same as the one illustrated in FIG. 4.7, except that the magnetic platter 133 has embedded (or disposed thereon) a permanent magnet ring 135.

While the invention has been described in connection with various embodiments, it will be understood that the invention is capable of further modifications. This application is intended to cover any variations, uses or adaptation of the invention following, in general, the principles of the invention, and including such departures from the present disclosure as come within known and customary practice within the art to which the invention pertains.

What is claimed is:

1. An electric spindle motor having a thrust bearing separate from a radial bearing, comprising:

a base plate;

a rotatable assembly including a rotatable sleeve extending substantially perpendicular from said base plate along a rotational axis, wherein said rotatable assembly is supported by said base plate;

a radial bearing including a stationary shaft securely coupled to said base plate, and extending within said sleeve along said rotational axis and spaced therefrom to define a first clearance gap and a liquid situated within said first clearance gap for providing at least radial stiffness for said rotatable sleeve;

a thrust plate and a thrust plate supporter securely coupling said thrust plate to said base plate;

a thrust bearing securely coupled to said rotating assembly, wherein said thrust bearing is shaped complementary with said thrust plate and spaced apart therefrom to form a second clearance gap, said thrust bearing being separate from radial bearing, and a gas fluid situated within said second clearance gap for providing at least axial stiffness for said rotatable assembly;

a stator for causing the rotation of said rotatable assembly;

a magnetic device operated by an electrical current for moving said rotatable assembly away from said base plate substantially along said rotational axis so that said rotatable assembly is less supported by said base plate during rotation of said rotating assembly, said magnetic device including a stator lamination with coil securely coupled to said thrust plate supporter and a magnetic plate securely coupled to said rotatable assembly, and a magnetic preloading means including a permanent magnet mounted to said magnetic plate to urge said separate thrust bearing into a rotatable assembly stop position for preventing free movement of said rotatable assembly when said current is not supplied to said magnetic device.

2. The electric spindle motor of claim 1, further including at least one magnetic seal to reduce leaking of said liquid fluid from said first clearance gap wherein said at least one magnetic seal comprises upper and lower magnetic seals to reduce leaking of said liquid fluid between an upper end of said sleeve and said shaft, and a lower end of said sleeve and said shaft.

3. The electric spindle motor of claim 2, wherein said magnetic seal comprises a sealing ring disposed proximate an end of said sleeve and in contact with a perimeter surface of said shaft, wherein a ferrofluid gap exists between said seating ring and said shaft to receive a ferrofluid, and a magnetic structure disposed proximate said sealing ring to hold said ferrofluid within said ferrofluid gap, wherein said magnetic structure includes a magnetic ring situated around said sealing ring.

4. The electric spindle motor of claim 3, wherein said ferrofluid gap is formed by a recess in the sealing ring, wherein said ferrofluid gap is formed between a wedge shaped inner surface of said sealing ring and said shaft.

5. The electric spindle motor of claim 2, further including upper and lower liquid absorbers situated proximate respective upper and lower magnetic seals for absorbing said liquid fluid if it leaks.

6. The electric spindle motor of claim 2, wherein said magnetic seal provides an electrical path for discharging static charges from a surface of a disk disposed on said rotatable assembly.

* * * * *